March 4, 1958    D. S. ROBERTS    2,825,475
MACHINE FOR COUNTING AND STACKING RIGID OR SEMI-RIGID
FLAT OBJECTS
Filed Feb. 5, 1954    3 Sheets-Sheet 1
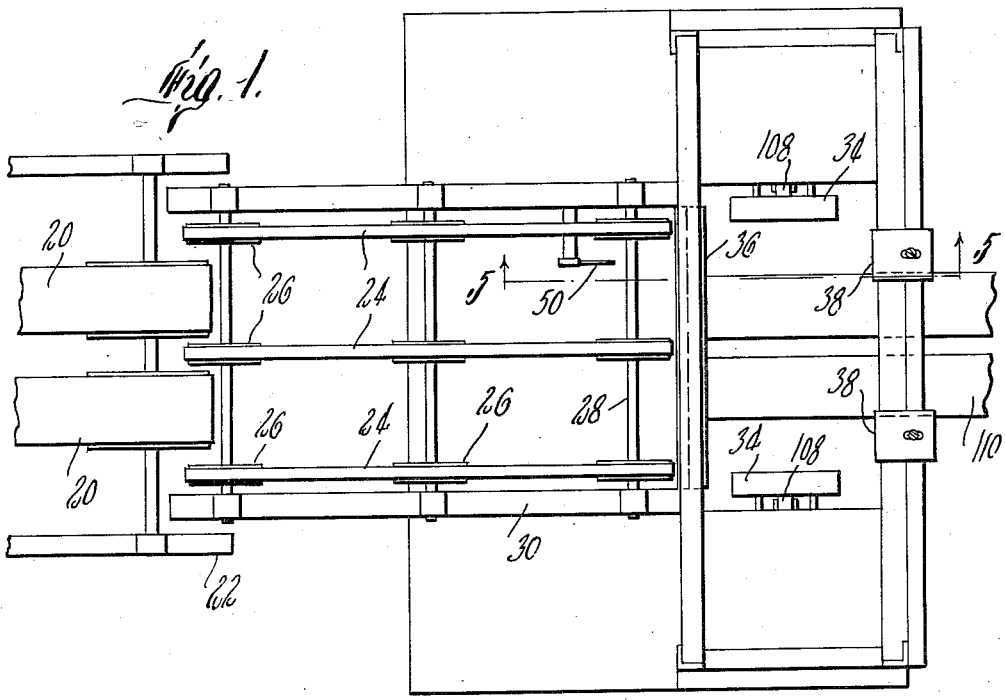
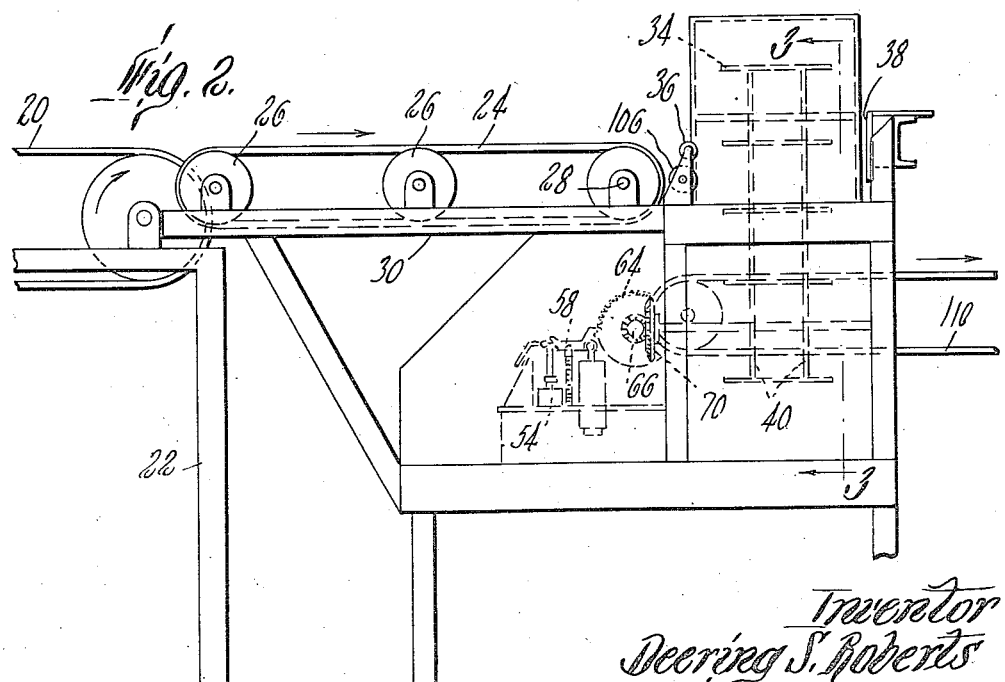
Inventor
Deering S. Roberts
by Wright, Brown,
Quinby & May Attys.

March 4, 1958　　　D. S. ROBERTS　　　2,825,475
MACHINE FOR COUNTING AND STACKING RIGID OR SEMI-RIGID
FLAT OBJECTS
Filed Feb. 5, 1954　　　　　　　　　　3 Sheets-Sheet 2

Inventor
Deering S. Roberts
by Wright, Brown,
Quimby & May
Attys.

March 4, 1958 D. S. ROBERTS 2,825,475
MACHINE FOR COUNTING AND STACKING RIGID OR SEMI-RIGID
FLAT OBJECTS
Filed Feb. 5, 1954 3 Sheets-Sheet 3
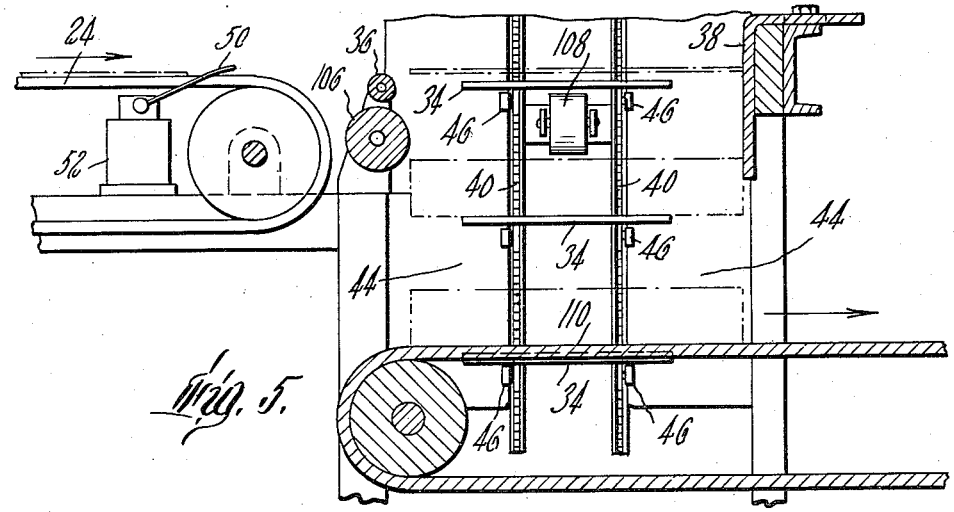
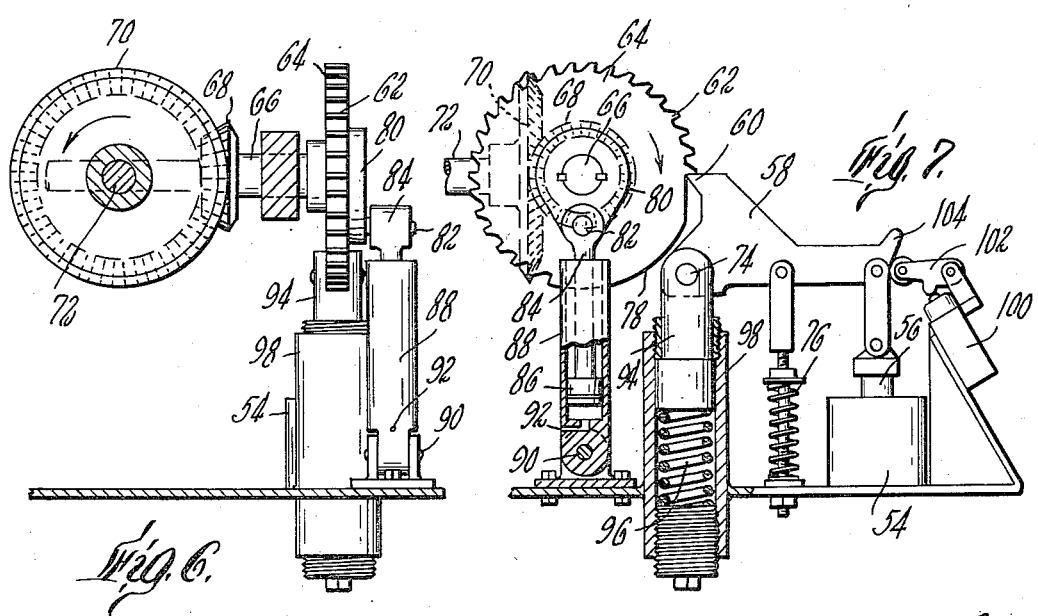
Inventor
Deering S. Roberts

# 2,825,475

MACHINE FOR COUNTING AND STACKING RIGID OR SEMI-RIGID FLAT OBJECTS

Deering S. Roberts, Marshfield, Mass.

Application February 5, 1954, Serial No. 408,342

3 Claims. (Cl. 214—6)

This invention relates to a machine for counting and stacking slab-like pieces of rigid or semi-rigid sheet material delivered to it in succession, the machine being for the most part actuated by the weight of the work-pieces which it receives. By utilizing the force of gravity a comparatively simple and inexpensive machine is produced which is reliable and effective in operation.

In the manufacture of certain articles of building material such as fabricated siding, roofing and the like, the product is delivered from the machine in a rapid succession of similar pieces which have to be counted and stacked so as to be made up into uniform packages for shipment. It is an object of the invention to provide a machine having a simple mechanical counting mechanism controlled by the work-pieces themselves and operated by the weight of the work-pieces to collect orderly stacks of predetermined numbers and to discharge the stacks quickly when completed so as to make way for the building of the next stack. For a more complete understanding of the invention, reference may be had to the following description thereof and to the drawings, of which:

Figure 1 is a plan view of a machine embodying the invention;

Figure 2 is a side elevation of the same;

Figure 5 is a section on the line 5—5 of Figure 3 on an enlarged scale:

Figure 6 is a section on the line 6—6 of Figure 4, on an enlarged scale; and

Figure 7 is a side view of the mechanism shown in Figure 6.

Figure 4:
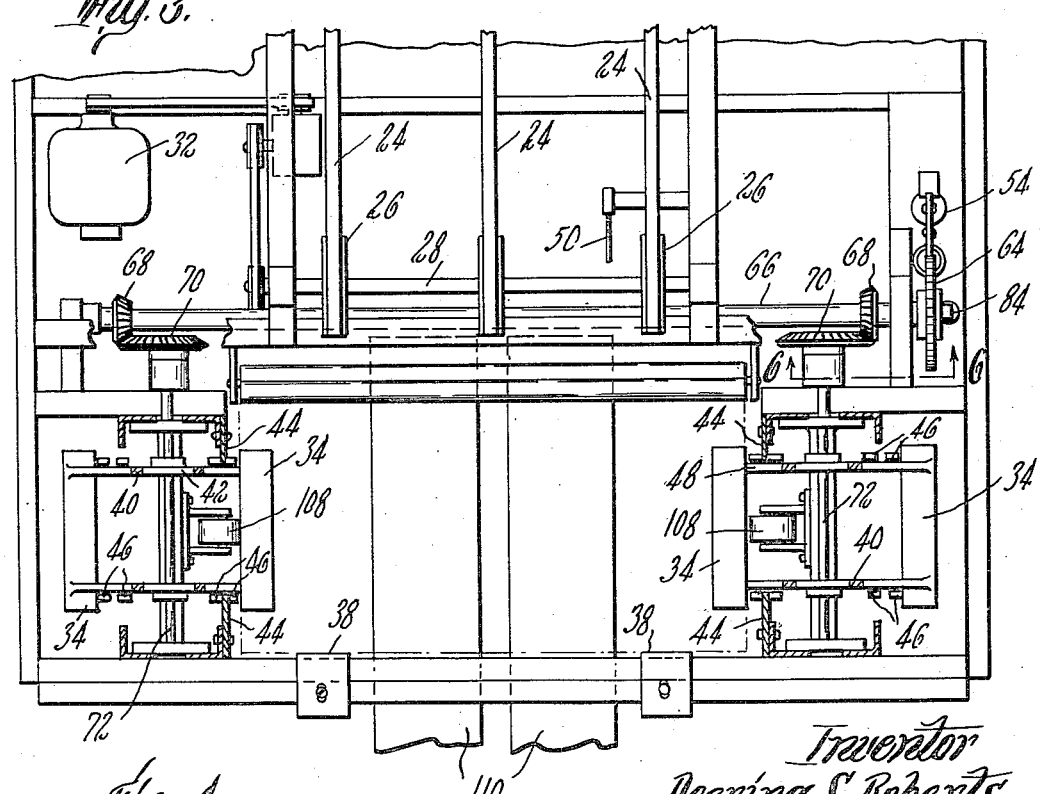
Figure 4 is a section on the line 4—4 of Figure 3.

The machine illustrated on the drawings is designed to handle slab-like articles, for example, rectangular pieces of such material as asbestos siding or the like, which pieces are delivered edgewise in succession from the machine by which they are made, such delivery being effected by an endless conveyor 20, supported by a frame 22. In the mechanism illustrated on the drawings the work-pieces are carried by the conveyor 20 with their long dimension extending across the conveyor. This conveyor delivers the work-pieces one by one to a short conveyor 24 which as indicated in Figure 1, consists of a plurality of relatively narrow belts spaced apart, three such belts being illustrated. These belts pass around suitable rolls 26 carried by shafts 28 which are journalled in suitable bearings on a main frame 30. The conveyor 24 is adapted to be constantly driven during the operation of the machine by any suitable means such as an electric motor 32 (Figure 4) connected by suitable power transmission means to one of the shafts 28.

The work-pieces which are advanced by the conveyor 24 are delivered at a loading station onto a pair of support elements 34 which may be in the form of shelves arranged to underlie the end portions of the work-pieces and thus support them. A pair of shelves 34 are initially located at the loading station at a level slightly below that of the bearing surface of the conveyor 24 so that the first work-piece to be delivered thereto by the conveyor passes over a supporting and guiding roller 36 and travels across this pair of shelves until its leading edge hits a pair of fixed stops 38. The shelves are then lowered by means hereinafter described a distance equal to the thickness of a work-piece. Thus the work-piece on the shelves is thereupon located at such a level that its top surface is ready to receive the next successive work-piece from the conveyor 24. The shelves are lowered in this manner each time a work-piece is received thereon until the predetermined number have been stacked. The shelves are then quickly lowered out of the way and replaced by another set of shelves in position to receive the first work-piece for a new stack.

Each of the shelves 34 of this pair are one of a series of similar shelves carried by endless conveyors which are vertically arranged in parallel spaced relation and comprise belts or chains 40 which pass around sprocket wheels 42 supported on the vertical stretches (Figure 3), the inner stretches supporting series of horizontal shelves 34 right side up, the outer stretches supporting shelves 34 in inverted position. When a complete stack of work-pieces has been accumulated on a pair of the shelves, they are lowered by the weight of the work-pieces thereon, and the next shelves in the series move into place substantially on a level with the conveyor 24. The shelves on the inner stretches of chain are maintained at a constant distance from each other by fixed vertical guide rails 44 (Figures 3 and 4) which are engaged by rollers 46. Two of these rollers are mounted on each of the arms 48 which connect the shelves 34 with the chains 40. The rollers on each arm 48 are at different levels so that they serve also to maintain the shelves on the inner stretches of the chain in horizontal positions.

The step-by-step descent of the shelves 34 is controlled by mechanism illustrated in Figures 5, 6 and 7. As each work-piece is advanced by the conveyor 24 it strikes a finger 50 which normally projects slightly above the level of the conveyor. When the trailing edge of the work-piece passes the finger 50 the release of the latter closes a micro-switch 52. The switch remains closed until the circuit in which the switch is connected is broken elsewhere as hereinafter described, whereupon the switch 52 opens. The circuit (not shown) includes a source of electric energy and a solenoid 54. The armature 56 of the solenoid is connected to a lever 58 which includes a pawl 60 normally engaging one of a series of teeth 62 on the periphery of a ratchet disk 64. The disk is mounted on a shaft 66 which extends across the machine (Figure 4) and carries two bevel gears 68 which mesh with larger bevel gears 70. The latter are mounted on shafts 72 on which are also mounted the lower sprocket wheels 42. The weight of the work-pieces carried by shelves 34 tends to rotate the sprocket wheels 42 and therefore tends to rotate the ratchet disk 64 through the gearing 68 and 70. Hence when a work-piece closes the switch 52 to energize the solenoid, the lever 58 is rocked about its pivot 74 to retract the pawl 60 momentarily from the ratchet 64 allowing the ratchet disk to rotate. As soon as the pawl is retracted, the electric circuit is broken by means hereinafter described and the lever 58 is at once rocked back by a compressed spring 76 so that the pawl engages the next tooth on the ratchet wheel. The teeth are so spaced that the rotation of the wheel to bring the next successive tooth against the pawl 60 lowers the shelves 34 a distance equal to the thickness of a work-piece. A complete revolution of the ratchet wheel moves each pair of shelves to the positions previously occupied by the shelves next ahead of them in the series. There are as many teeth 62 on the ratchet wheel 64 as the number of work-pieces which are to compose a stack. This series of teeth extends only part way around the circumference of the wheel 64, the remainder of the edge being a smooth arc as at 78. When the pawl 60 has thus engaged in succession all of the teeth 62, that is, when the predetermined numbers of work-pieces for a stack have tripped the finger 50, the next reciprocation of the lever 58 causes the pawl to engage on the arcuate edge portion 78 of the disk 64. The wheel then turns quickly until the pawl 60 is engaged by the first tooth 62 of the series on the disk as the loaded shelves descend to move the next pair into position to receive work-pieces from the conveyor 24. In order to ease the descent of the loaded shelves when the pawl 60 rides on the arcuate edge portion 78, the shaft 66 carries a crank member 80 having a crank-pin 82 connected by a rod 84 to a piston 86 reciprocable in a cylinder 88 pivoted at 90 to the main frame. The chamber in the cylinder 88 below the piston 86 communicates with the open air through a small hole 92. The crank 80 is angularly related to the arcuate edge portion 78 of the ratchet disk in such a way that when the pawl 60 rides on the smooth arc, the piston is descending in the cylinder to its lowermost position as shown in Figure 7. The air below the piston is compressed and acts as a cushion or dash-pot to check the descent of the shelves. A further cushion is provided by mounting the lever pivot 74 in a plunger 94 which is pressed upward to its normal position as shown in Figure 7 by a spring 96, the upward movement of the plunger being limited by a shoulder 98. If the first tooth of the series on the disk 64 strikes the pawl 60 too hard after the pawl has travelled over the arc 78, the plunger 94 which carries the pivot 74 can yield against the pressure of the spring 96 to cushion the blow.

Whenever the finger 50 is rocked and then released by a work-piece, the switch 52 closes the circuit causing the solenoid 54 to rock the pawl lever 58 as hereinbefore described. This movement of the lever also opens a normally closed switch 100 by means of an actuating lever rocked by a cam 104 which is a part of the pawl lever 58. The opening of the circuit allows the spring 76 to rock the lever 58 back so that the pawl 60 again engages the disk 64 and also causes the switch 52 to open so that the circuit then remains open until the next work-piece rocks and releases the finger 50.

It is desirable that the work-pieces in a stack register accurately with one another so that the sides of the stack will be true. When the work-pieces are discharged from the conveyor 24, they are liable to hit the stops 38 with sufficient force to rebound slightly. In order to align the edges with the edges of the work-pieces below, an idle roll 106 is mounted beneath the guide roll 36, the distance of the roll 106 from the stops 38 being just equal to the width of a work-piece. To align the end edges of the work-pieces, two rolls 108 are mounted on the main frame at the same level as the truing roll 106. The rolls 108 are spaced apart a distance just equal to the long dimension of a work-piece. As the shelves carrying the growing stack descend, the work-pieces move successively down between the roll 106, the stops 38 and the rolls 108 are thus moved into registry with the work-pieces below.

Figure 3:
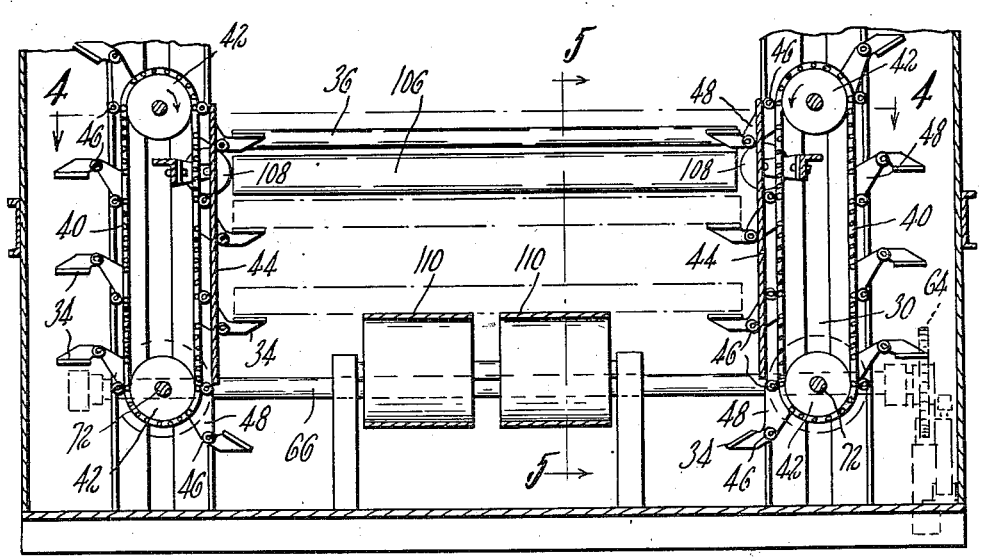
Figure 3 is a section on the line 3—3 of Figure 2.

As indicated in Figure 3, when a pair of shelves have received the full number of work-pieces for a stack, they move down to an intermediate position and are replaced at the receiving level by the next pair of shelves. From the intermediate position they eventually move down to the stack-releasing position wherein the shelves are slightly below the level of a discharge conveyor 110 which is constantly driven. The stack is thus deposited on the conveyor 110 and carried away as the stack next above moves into the intermediate position. This latter stack provides weight for the operation of the shelves while the stack above it is being built up.

I claim:

1. A machine for stacking slab-like articles in groups of predetermined numbers, which comprises vertically movable support means adapted to receive successive articles thereon, means for supplying articles in succession to said support means, an electric switch arranged to be engaged and then disengaged by each said article in passing toward said support means and to be closed by such disengagement and to remain closed until its circuit is broken elsewhere, releasable means for positively locking said support means against downward movement at a series of different levels, said locking means comprising a ratchet disk having a series of ratchet teeth extending part way around its circumference and equal in number to the number of articles to be grouped in a stack, a pawl normally engaging one of said teeth, and electrically controlled means for retracting said pawl momentarily whereby to shift said pawl from one tooth to the next, said electrically controlled means including a normally closed switch in series with the first said switch and openable by movement of said pawl out of engagement with said ratchet teeth.

2. A machine as in claim 1, and means for resiliently cushioning the impact of said pawl against the first tooth of said series when it is shifted thereto from contact with the last tooth of said series.

3. A machine for stacking slab-like articles in groups of predetermined numbers, which comprises two endless conveyors vertically arranged in parallel spaced relation with a vertical stretch of one opposite to a vertical stretch of the other, support elements projecting from each said conveyor at uniformly spaced intervals, said vertical stretches each having a plurality of said support elements at the same levels as the corresponding elements on the other, the support elements on said vertical stretches constituting pairs adapted to support slab-like articles deposited thereon, means for depositing a slab-like article on one of said pairs at a loading station, means for holding said conveyors against downward movement of the loaded support elements, means controlled by articles approaching said loading station to operate said holding means intermittently to release said conveyors to be moved predetermined distances by the weight of articles on some of said support elements, said holding means comprising a ratchet disk having a series of teeth equal in number to the number of articles to be stacked in a group, said series of teeth extending part way around the circumference of said disk, a pawl normally engaging one of said teeth, and a solenoid energizable to retract said pawl momentarily to shift said pawl from one tooth to the next, said electrically controlled means including a circuit having said solenoid connected therein, a switch operable by articles approaching said support means to close said circuit, means operable by retractive movement of said pawl to open said circuit, and means automatically removing from each said pair arriving at the delivery station the articles carried thereby.

References Cited in the file of this patent

UNITED STATES PATENTS

| | | |
|---|---|---|
| 1,545,225 | Zeh | July 7, 1925 |
| 1,646,381 | Roberts | Oct. 18, 1927 |
| 1,761,632 | Koehler | June 3, 1930 |
| 2,065,674 | Fay | Dec. 29, 1936 |
| 2,612,983 | Alden | Oct. 7, 1952 |
| 2,637,450 | Eshelman | May 5, 1953 |